United States Patent [19]

Honeycutt et al.

[11] Patent Number: 4,658,109
[45] Date of Patent: Apr. 14, 1987

[54] CYLINDRICAL LASER WELDER

[75] Inventors: Thomas E. Honeycutt, Somerville; Thomas G. Roberts, Huntsville, both of Ala.

[73] Assignee: The United States of America as represented by the Secretary of the Army, Washington, D.C.

[21] Appl. No.: 864,638

[22] Filed: May 15, 1986

[51] Int. Cl.⁴ .............................................. B23K 26/00
[52] U.S. Cl. ........................ 219/121 LC; 219/121 LP; 219/121 LQ
[58] Field of Search ................. 219/121 LC, 121 LD, 219/121 LP, 121 LQ, 121 LR, 121 LE, 121 LF; 372/92, 99

[56] References Cited

U.S. PATENT DOCUMENTS

| | | | |
|---|---|---|---|
| 3,622,907 | 11/1971 | Tomlinson et al. | 372/92 |
| 3,681,709 | 8/1972 | Brown | 372/92 X |
| 3,943,324 | 3/1976 | Haggerty | 219/121 LQ X |
| 4,215,263 | 7/1980 | Grey et al. | 219/121 LQ X |
| 4,547,650 | 10/1985 | Arditty et al. | 219/121 LQ X |
| 4,580,270 | 4/1986 | Johnson et al. | 372/99 X |

FOREIGN PATENT DOCUMENTS 0181790 11/1982 Japan ............................ 219/121 LR Primary Examiner—C. L. Albritton
Attorney, Agent, or Firm—John C. Garvin, Jr.; Freddie M. Bush

[57] ABSTRACT

A laser welder is provided that generates output energy focused in a circular or cylindrical shape for simultaneously welding around a 360° circumference without unnecessarily heating large amounts of material. The welder may be used to fasten cylindrical shaped objects, gears and shafts together, which is difficult to do by conventional means. The welder may also be used to fasten one cylinder to another.

To accomplish the welding, a laser has an unstable optical cavity arranged with its feedback mirror centered to generate a circular output beam having an obscuration in the center. A circularly-symmetric, off-axis concave mirror focuses the output beam onto the objects being fastened and away from the center line or axis of the circular beam.

5 Claims, 3 Drawing Figures

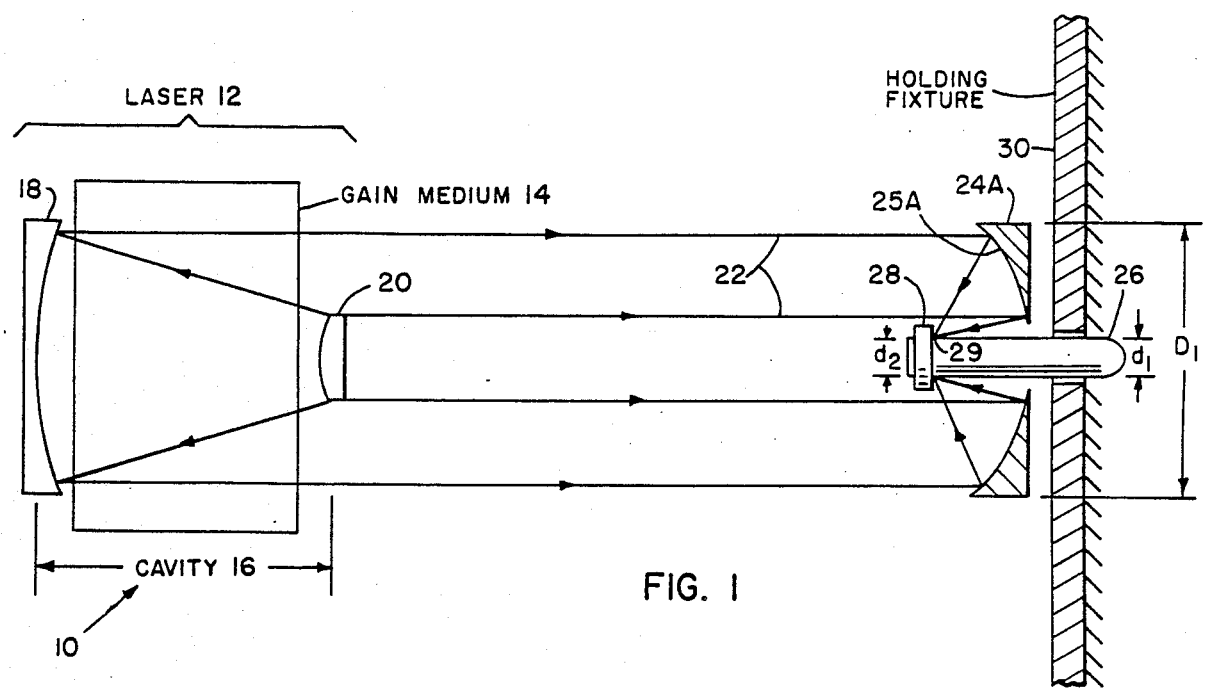
FIG. 1
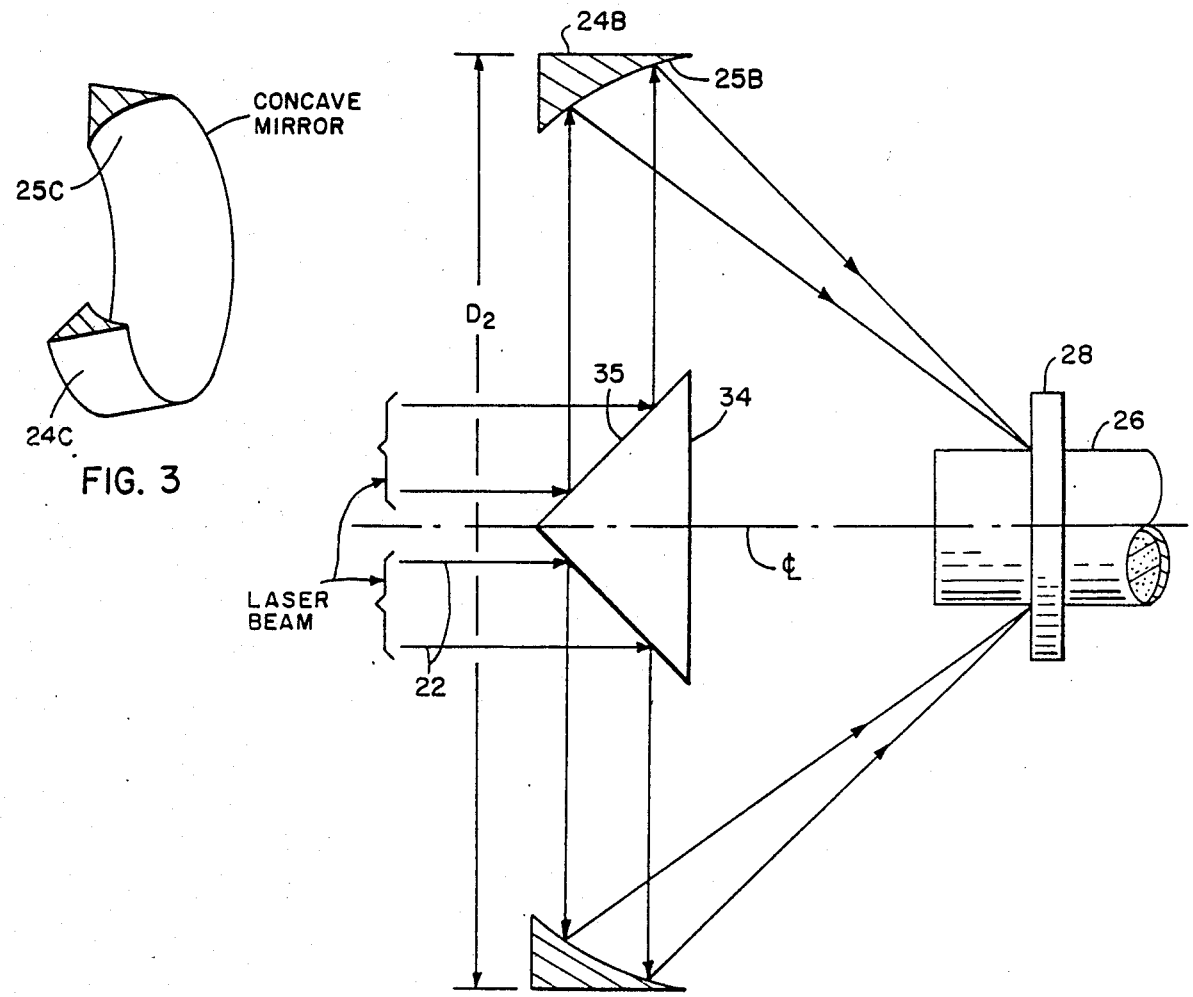
FIG. 3
FIG. 2

CYLINDRICAL LASER WELDER

DEDICATORY CLAUSE

The invention described herein may be manufactured, used, and licensed by or for the Government for governmental purposes without the payment to us of any royalties thereon.

BACKGROUND OF THE INVENTION

Brass retainer rings are currently fastened to artillery shells by spinning each shell at a high rate and then jamming the ring on it so that it is fastened or welded by friction between the two objects. This is an energy-inefficient process which heats and weakens more material that is desirable. The shell spinning at a high rate is also potentially dangerous.

Prior art laser welders which utilize an unstable optical cavity have an output beam wherein a far-field pattern is generated and is actually focused on the objects to be fastened. Thus, the weld occurs along the centerline or axis of the output beam and there is no hole in the center of the beam. Prior art welders of this type are limited to a few kilowatts (5-15 kw) of output power.

SUMMARY OF THE INVENTION

A cylindrical laser welder is provided that allows a circular weld to be obtained without rotation of the welder or objects being welded. Output energy from a laser is focused into a circular or cylindrical shape for simultaneously welding a 360° circumference while heating only a minimum area of material necessary to complete the weld. The beam of energy is shaped by a feedback mirror and a reflecting mirror to provide an output beam having a circular cross-section that is hollow. This hollow beam is focused on the target area by a circularly-symmetric, off-axis, concave mirror.

BRIEF DESCRIPTION OF THE DRAWINGS

FIG. 1 is a schematic of a preferred configuration for fastening two objects.

FIG. 2 is a schematic of an alternative embodiment for fastening two objects.

FIG. 3 is a diagrammatic drawing of a typical concave mirror.

DETAILED DESCRIPTION OF THE INVENTION

Referring now to the drawings wherein like numbers represent like parts and wherein extraneous system components such as power supplies and support hardware are not shown, FIG. 1 discloses the cylindrical laser welder 10 to comprise a laser 12 having a gain medium 14 and an unstabled optical cavity 16. Cavity 16 has respective mirrors 18 and 20 arranged with the feedback mirror 18 centered so that the output beam 22 from the cavity is circular in shape but having an obscuration in the center; that is, there is no output energy in this center region. The obscuration is provided by reflecting mirror 20, which prevents the central portion of the beam from passing out of the cavity thereby providing a hollow output beam. In the welder a circularly-symmetric off-axis concave mirror 24A is used to focus the output beam 22 onto the objects to be fastened together. As shown, figuratively, the first object is an artillery shell 26 having an outer diameter $d_1$ that is substantially equal to the inner circular surface of a brass retainer ring 28 having inner diameter $d_2$. Mirror 24A has a diameter $D_1$ and an aperture through the center thereof through which artillery shell 26 is passed, the shell being held in position along the center line of the output from laser 12 by a holding fixture 30. Shell or object 26 is positioned with respect to mirror 24A so that the circularly-symmetric surface 25A of the mirror brings the circularly shaped beam into focus around a circle where ring 28 and object 26 come together. In this manner, all 360° of the needed circular weld is simultaneously made around the circumference of object 26 where the inner edge of object 28 joins object 26. This welding action takes place without moving either the welder or the objects being welded during the welding process.

The cylindrical laser welder is very useful in situations where two cylindrical objects must be welded together whether the outside circumferences are identical or the inside circumference of one is identical to the outer circumference of the other, for example. Typical examples include not only the retainer ring welded to the artillery shell as noted hereinabove, but also fastening or welding of gears together (which is difficult to accomplish by conventional means) fastening cylinders together or fastening permanent magnets inside drift tubes for linear accelerators. This welding method minimizes damage from overheating of the objects being fastened due to welding as caused in prior art welders.

Additionally, the cylindrical laser welder, by instantaneously or simultaneously welding around a circumference, allows the 5-15 kw limit of prior art welders to be increased by at least an order of magnitude since quite long welds can be made without damage.

FIG. 2 discloses a slightly different embodiment of the cylindrical laser welder 10. Cavity mirrors 18 and 20, gain medium 14, cavity 16, and holding fixture 30 are subsantially identical to that shown in FIG. 1 and are accordingly not shown again. However, output beam 22 from the laser 10 is shown directed toward a cone-shaped mirror 34. Cone-shaped mirror 34 is positioned along the center line of the hollow output beam so that surface 35 directs beam 22 to the circularly-symmetric surface 25B of a concave mirror 24B for focusing the beam in the same manner noted hereinabove onto the joining surfaces or edges of objects 26 and 28. Mirror 24B has a larger diameter $D_2$ than that of mirror 24A and may, if desired, have a different focal length. The cone-shaped mirror is used to reflect the output beam 22 radially to the concave mirror which focuses the beam onto the objects to be fastened.

In both of the embodiments the concave mirror 24 is considered to be a fixed-focus mirror. Thus, each concave mirror brings the output beam 22 to a resultant circular focal pattern that is fixed at the point or circle of joinder of two objects. This means that for any given concave mirror 24 the objects to be welded will always be placed the same distance from the mirror and the circle of weld will be the same diameter. Thus, a family or array of concave mirrors having different focal planes and different diameters at the plane of focus for beams directed therefrom can be readily used for welding different sizes of objects by simply changing the concave mirror in the fixture (not shown) that holds the mirror. Alternatively, adaptive optics may be used to adjust this focal plane and focus diameter.

Theoretically, the off-axis concave mirror as shown in the embodiment of FIG. 1 could be replaced by a torroidal lens to perform welding on the opposite side of ring 28 as shown in FIG. 1. However, in reality the output intensity of these cylindrical laser welders is such that torroidal lens materials are incapable of passing this energy.

FIG. 3 is a cutaway view of a typical mirror 24C having a concave surface 25C. Mirror 24C has an aperture through the center thereof and provides reflection and focusing of the hollow beam into a ring focused on the objects being welded. The designations A, B, and C for mirrors 24 and surfaces 25 are used merely to indicate that each of these mirrors can be one of a family of mirrors, each having different focal planes and different diameters at the planes of focus for welding objects of various diameters.

It is to be understood that the form of the invention, herewith shown and described, is to be taken as a preferred example of the invention, and that various changes may be resorted to without departing from the spirit and scope of the invention. Accordingly, the scope of the invention is to be limited only by the claims appended hereto.

We claim:

1. A laser welder for simultaneously welding around a complete circumference and comprising: a laser having a feedback mirror and a fully reflecting mirror for providing an unstable optical cavity, said laser providing a hollow, circular output beam along an axial path; a circularly-symmetric concave mirror for receiving the hollow laser beam, redirecting the beam, and focusing the beam into a focal ring in a predetermined focal plane; a holding fixture for holding an object having a cylindrical member to be welded within said focal plane.

2. A laser welder as set forth in claim 1 wherein said concave mirror has a central aperture therein aligned coaxially with said laser, and wherein said fixture is aligned with said laser for holding an object to be welded within and projecting through said aperture, said mirror being disposed between said laser and said holding fixture.

3. A laser welder as set forth in claim 1 and further comprising a cone-shaped mirror disposed in the optical path between said laser and said concave mirror for receiving the output beam from the laser and reflecting it radially to the concave mirror.

4. A laser welder as set forth in claim 3 wherein said concave mirror has a central aperture therein aligned coaxially with the output beam of said laser, and said cone-shaped mirror is disposed on said axial path within said aperture.

5. A laser welder as set forth in claim 4 wherein said fixture is aligned for holding a weldable object in the laser beam path at the focal plane.

* * * * *